(12) United States Patent
Malvasi et al.

(10) Patent No.: US 11,078,905 B2
(45) Date of Patent: Aug. 3, 2021

(54) AUTOMOTIVE ELECTRICAL OIL PUMP

(71) Applicant: PIERBURG PUMP TECHNOLOGY GMBH, Neuss (DE)

(72) Inventors: Alessandro Malvasi, Leghorn (IT); Viktor Schroeder, Leghorn (IT)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 177 days.

(21) Appl. No.: 16/068,897

(22) PCT Filed: Jan. 12, 2016

(86) PCT No.: PCT/EP2016/050458
§ 371 (c)(1),
(2) Date: Jul. 10, 2018

(87) PCT Pub. No.: WO2017/121461
PCT Pub. Date: Jul. 20, 2017

(65) Prior Publication Data
US 2019/0010943 A1    Jan. 10, 2019

(51) Int. Cl.
*F04C 15/06* (2006.01)
*F04C 2/10* (2006.01)
*F16N 13/20* (2006.01)
*F04C 15/00* (2006.01)

(52) U.S. Cl.
CPC ............. *F04C 15/06* (2013.01); *F04C 2/102* (2013.01); *F16N 13/20* (2013.01); *F04C 15/0057* (2013.01); *F16N 2210/04* (2013.01)

(58) Field of Classification Search
CPC ............... F04C 2/10–103; F04C 15/06; F04C 15/0075; F16N 13/20; F16N 2210/04; B60R 17/02
USPC ................................... 418/61.3, 68
See application file for complete search history.

(56) References Cited

U.S. PATENT DOCUMENTS

| | | | |
|---|---|---|---|
| 3,791,765 A * | 2/1974 | Hansen | F04C 15/00 417/357 |
| 4,032,263 A | 6/1977 | Pareja | |
| 5,145,329 A * | 9/1992 | Zumbusch | F02M 37/041 417/356 |

(Continued)

FOREIGN PATENT DOCUMENTS

| | | |
|---|---|---|
| CN | 203962379 U | 11/2014 |
| CN | 104456036 A | 3/2015 |
| JP | 52-40802 A | 3/1977 |

(Continued)

*Primary Examiner* — Alexander B Comley
(74) *Attorney, Agent, or Firm* — Norman B. Thot

(57) ABSTRACT

An automotive electrical oil pump includes an oil displacement pumping unit with a pump rotor which rotates in a pump chamber so as to pump a pressurized oil to an oil recipient, an electric driving motor which drives the pump rotor of the oil displacement pumping unit, an electrical connector plug which electrically connects the electric driving motor to a power source, and a fluid connector. The fluid connector includes a pump inlet which is fluidically connected to a chamber inlet, a pump outlet which is fluidically connected to a chamber outlet, a center front opening, and a ring front opening which is arranged coaxially to the center front opening. The center front opening and the ring front opening define the pump inlet and the pump outlet.

18 Claims, 4 Drawing Sheets

(56) References Cited

U.S. PATENT DOCUMENTS

2010/0290934 A1* 11/2010 Hadar .................... F04B 17/03
                                                    417/410.4
2015/0086405 A1    3/2015 Konakawa et al.

FOREIGN PATENT DOCUMENTS

| JP | 55-60685 A    | 5/1980  |
| JP | 62-98095 A    | 5/1987  |
| JP | S6298095    * | 5/1987  |
| JP | 2015-172350 A | 10/2015 |

* cited by examiner

AUTOMOTIVE ELECTRICAL OIL PUMP

CROSS REFERENCE TO PRIOR APPLICATIONS

This application is a U.S. National Phase application under 35 U.S.C. § 371 of International Application No. PCT/EP2016/050458, filed on Jan. 12, 2016. The International Application was published in English on Jul. 20, 2017 as WO 2017/121461 A1 under PCT Article 21(2).

FIELD

The present invention relates to an automotive electrical oil pump.

The automotive electrical oil pump comprises an oil displacement pumping unit comprising a pump rotor rotating in a pump chamber for pumping pressurized oil to an oil recipient. The oil pump further comprises an electric driving motor for driving the pump rotor of the pumping unit, an electrical connector plug for electrically connecting the driving motor to a power source, and a fluid connector comprising a pump inlet and a pump outlet which are fluidically connected to a corresponding chamber inlet and chamber outlet of the pump chamber.

Such an automotive electrical oil pump has previously been described. However, the previously-described automotive electrical oil pumps have disadvantages. The oil pump must be arranged in a specific rotational position in order to establish a good fluidic connection between the pump inlet and the pump outlet of the fluid connector with the corresponding openings of a counter fluid connector. The orientation of the electrical connector, which is usually arranged with a radial plugging direction, is dependent on the orientation of the counter fluid connector. Every automotive manufacturer demands another orientation of the counter fluid connector and of the counter electrical connector. The pump supplier therefore needs many different pump versions to comply with the different required connector orientations.

SUMMARY

An aspect of the present invention is to provide an automotive electrically driven oil pump which is flexible with respect to different mounting conditions.

In an embodiment, the present invention provides an automotive electrical oil pump which includes an oil displacement pumping unit comprising a pump rotor which is configured to rotate in a pump chamber so as to pump a pressurized oil to an oil recipient, an electric driving motor configured to drive the pump rotor of the oil displacement pumping unit, an electrical connector plug configured to electrically connect the electric driving motor to a power source, and a fluid connector. The fluid connector comprises a pump inlet which is fluidically connected to a chamber inlet, a pump outlet which is fluidically connected to a chamber outlet, a center front opening, and a ring front opening which is arranged coaxially to the center front opening. The center front opening and the ring front opening define the pump inlet and the pump outlet.

BRIEF DESCRIPTION OF THE DRAWINGS

The present invention is described in greater detail below on the basis of embodiments and of the drawings in which.

DETAILED DESCRIPTION

Figure 1:
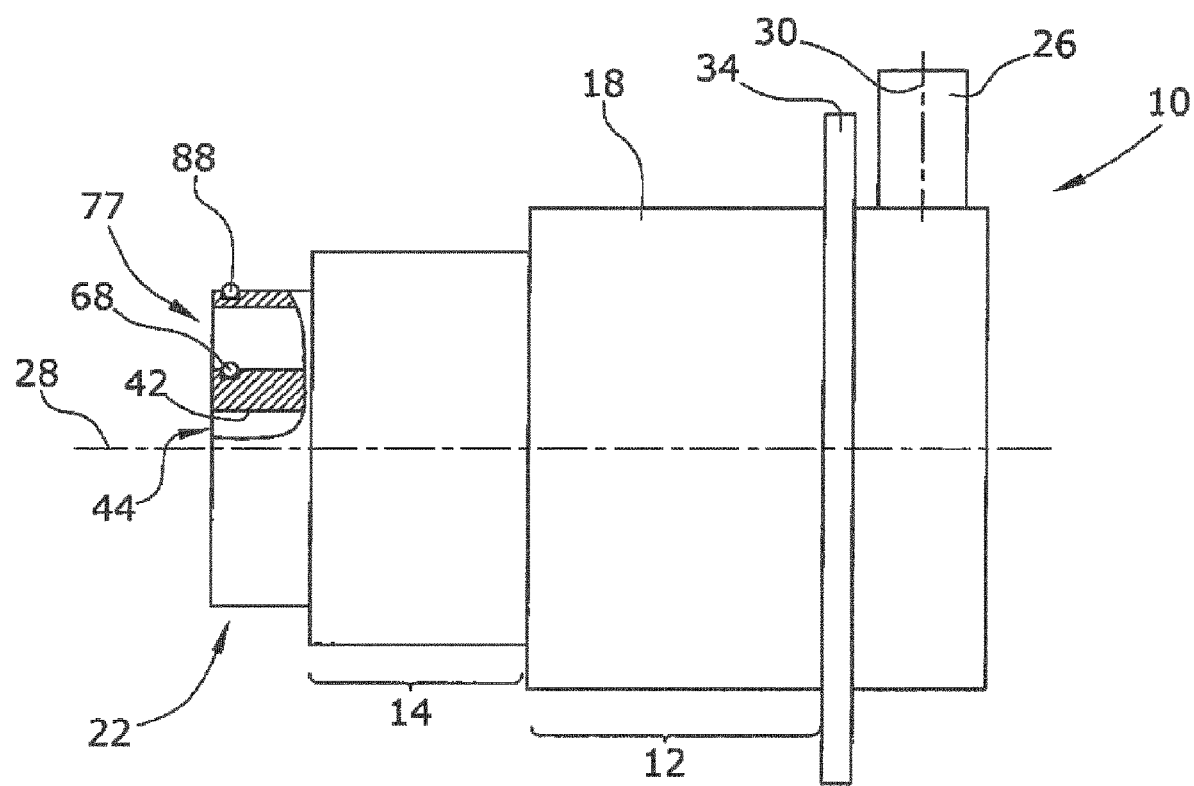
FIG. 1 shows, in part, a longitudinal section of an automotive electric oil pump according to the present invention.

According to the present invention, the fluid connector comprises a center front opening and a ring front opening arranged coaxially to the center front opening, the openings defining the pump inlet and the pump outlet. The front opening according to the present invention is an opening which is arranged on a front side of the pump so that the opening substantially opens in an axial direction of the pump. According to the present invention, the ring front opening has a ring-shaped design and is arranged around the center front opening. The inventive arrangement of the center front opening and the ring front opening provides a fluid connector having a pump inlet and a pump outlet which are both rotationally symmetric. The pump is therefore rotatable around the axis of the center front opening as long as the pump is not finally fixed to the counter fluid connector but is already plugged to the counter fluid connector. The pump can be rotated after plugging so that the electrical connector plug is rotationally positioned as required by the automotive manufacturer. The pump is therefore independent of the rotational position of the openings of the fluid counter connector. The pump is accordingly flexible with respect to different mounting conditions. Only one pump version is thus sufficient for fulfilling the different requirements of the automotive manufacturers.

In an embodiment of the present invention, the fluid connector can, for example, comprise a first circular opening wall arranged coaxially to the center front opening and defining at least one of the pump inlet and/or pump outlet, wherein the first circular opening wall fluidically separates the center front opening and the ring front opening.

In an embodiment of the present invention, the fluid connector can, for example, comprise a first and a second circular opening wall arranged coaxially to each other and defining at least one of the ring-shaped pump inlet and/or pump outlet. The first circular opening wall fluidically separates the center front opening from the ring front opening. The second circular opening wall surrounds both front openings and the first circular opening wall.

In an embodiment of the present invention, the first opening wall can, for example, be arranged coaxially to a rotation axis of the driving motor, which wall is arranged at a pump front side comprising the pump inlet and the pump outlet. The rotational axis of the fluid connector is provided in the center of the pump. The pump accordingly requires a minimal mounting space when being rotated to the required plugging direction of the electrical connector plug.

In an embodiment of the present invention, the first and the second circular opening walls can, for example, be arranged coaxially with a rotation axis of the driving motor, which walls are arranged at a pump front side comprising the pump inlet and the pump outlet. The rotational axis for rotating the pump into a suitable rotational mounting position is provided in the center of the pump. The pump accordingly requires a minimal mounting space when being rotated to the required plugging direction of the electrical connector plug.

In an embodiment of the present invention, the electrical connector plug can, for example, be arranged radially with a substantially radial plugging direction with respect to the motor rotation axis. As the electrical counter connector plug usually is provided in a radial plugging direction, the electrical connector plug can be provided according to the requirements of the automotive manufacturers.

In an embodiment of the present invention, the pumping unit can, for example, be defined by a gerotor assembly. The gerotor operates very quietly. The gerotor can also be operated in both rotational directions so that the pump inlet and the pump outlet can be simply exchanged by changing the rotational orientation of the pump. No second version of the pump is necessary if the pump inlet and the pump outlet must be changed.

In an embodiment of the present invention, the pump inlet can, for example, be arranged radially inside of the pump outlet. The pump outlet can alternatively be arranged radially inside of the pump inlet.

In an embodiment of the present invention, at least one of the coaxial circular walls can, for example, comprise a radial sealing ring so as to avoid the drawbacks of an axial sealing. The sealing quality of an axial sealing strongly depends on the axial connection of the pump. The sealing quality can be reduced by an axial overload caused by the mounting process damaging the sealing ring. The sealing quality can also be reduced because of a too loose axial fixation of the pump. These drawbacks can be overcome using radial sealing rings.

In an embodiment of the present invention, the radial sealing ring can, for example, be arranged at an outer circumferential surface of the circular wall. This sealing ring improves the respective tightness of the fluid connection between the center front opening and the ring front opening to the counter connector.

In an embodiment of the present invention, a connection channel connecting the center front opening with the chamber inlet or the chamber outlet can, for example, be provided, wherein the connection channels orientation has a radial component. The pump inlet and/or the pump outlet can be directly connected to a corresponding chamber inlet or a chamber outlet of the pump.

The following is a detailed description of an embodiment of the present invention under reference to the drawings.

FIG. 1 shows, in part, a longitudinal section of an automotive electric oil pump 10. The oil pump 10 comprises an electric driving motor 12 driving a pumping unit 14, both being provided in a pump housing 18. A fluid connector 22 is arranged at an axial front end which is axially opposite of the driving motor 12. The fluid connector 22 is connectable to a corresponding fluid counter connector (not shown in the drawings) of, for example, an automotive engine, a transmission, a heat-exchanger etc. so as to fluidically connect the oil pump 10 with an oil recipient, namely, the engine, the transmission, the heat-exchanger etc. An electrical connector plug 26 is arranged at an axial pump end opposite to the axial end with the fluid connector 22. The electrical connector plug 26 is arranged with a radial plugging direction 30 with respect a rotation axis 28 of the driving motor 12. A flange portion 34 is arranged at an axial end of the oil pump 10 for mechanically connecting the oil pump 10 to a corresponding counterpart.

Figure 2:
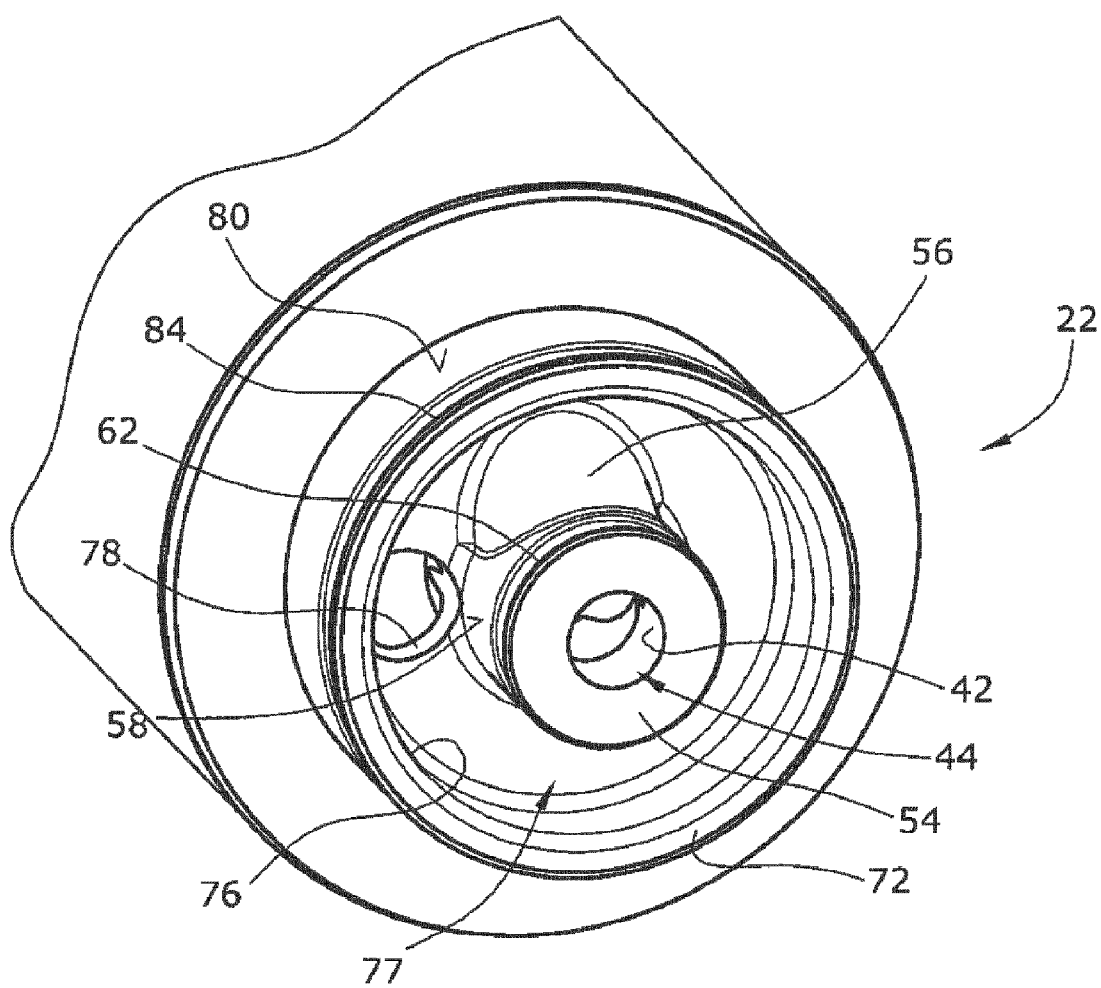
FIG. 2 shows a perspective view of the fluid connector of the pump according to FIG. 1 where the pump inlet is arranged radially inside of the pump outlet.

FIG. 2 shows the fluid connector 22 of the oil pump 10 in greater detail. The fluid connector 22 is provided with a center front opening 42 defining a pump inlet 44 through which the fluid can be sucked into the pumping unit 14. The center front opening 42 is surrounded by a first circular opening wall 54. The first circular opening wall 54 is arranged coaxially with the center front opening 42 and extends in an axial direction. A connection channel 56 fluidically connects the center front opening 42 with the pumping unit 14. The connection channels 56 orientation has a radial component. A first wall groove 62 is provided at an outer circumferential surface 58 of the first circular opening wall 54 to receive a radial sealing 68 (see FIG. 1) which is a first O-ring.

The fluid connector 22 further comprises a second circular opening wall 72 which is arranged coaxially to the first circular opening wall 54 and extends in an axial direction from the pump housing 18. The second circular opening wall 72 is arranged with a larger radius than the first circular opening wall 54 so as to form a ring-shaped ring front opening 76 defining a pump outlet 77 through which the pressurized fluid is emitted. An intermediate opening 78 is arranged at the bottom of the ring front opening 76 fluidically connecting the pump unit 14 with the ring front opening 76. A second wall groove 84 is provided at an outer circumferential surface 80 of the second circular opening wall 72 to receive a radial sealing 88 (see FIG. 1) which is a second O-ring.

The center front opening 42 is situated in a plane which is substantially parallel to a plane defined by the ring front opening 76. Both planes are substantially orthogonal to the rotation axis 28 of the driving motor 12.

Figure 3:
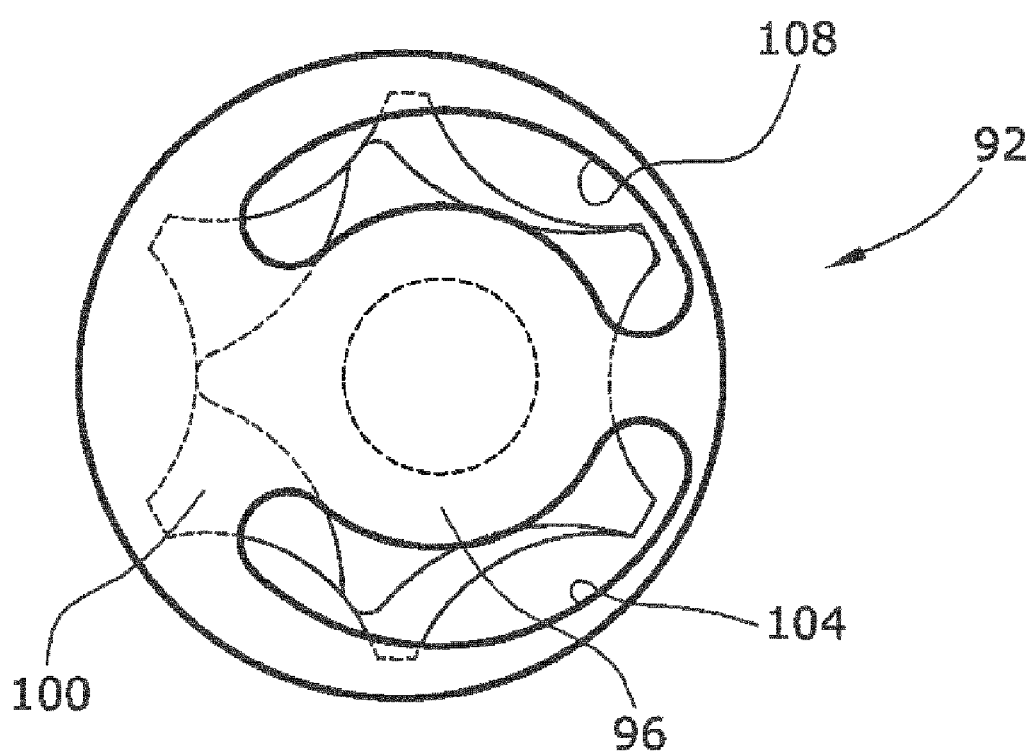
FIG. 3 shows a top view of the pumping unit.
Figure 4:
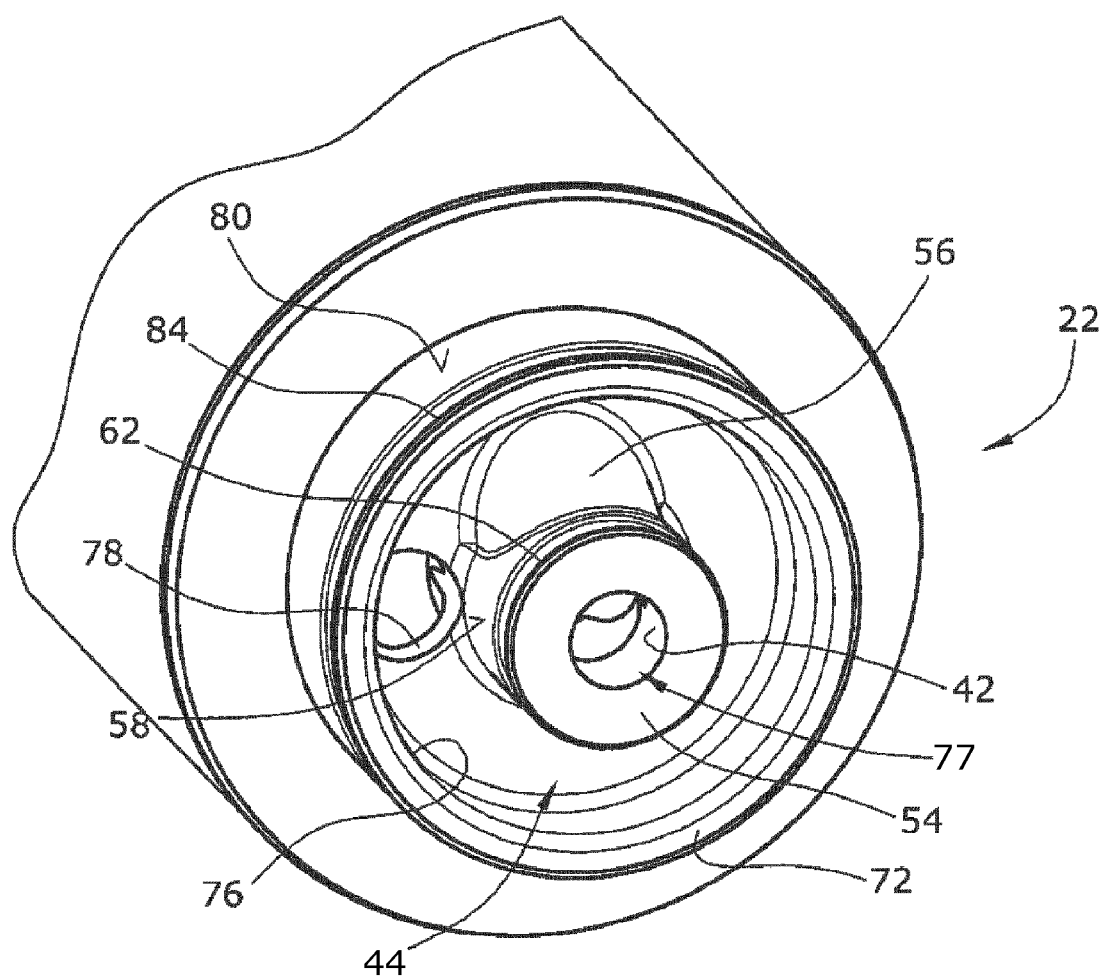
FIG. 4 shows a perspective view of the fluid connector of the pump according to FIG. 1 where the pump outlet is arranged radially inside of the pump inlet.

FIG. 3 shows a top view of a gerotor assembly 92 defining the pumping unit 14 in the oil pump 10. The gerotor assembly 92 comprises a pump rotor 96 rotating in a pump chamber 100. A kidney-shaped chamber inlet 104 is provided at an axial side of the gerotor assembly 92 through which the fluid is sucked into the gerotor assembly 92. A kidney-shaped chamber outlet 108 is provided through which pressurized fluid is emitted on the same axial side of the gerotor assembly 92 but radially substantially opposite to the chamber inlet 104. The chamber inlet 104 is fluidically connected with the center front opening 42 by the connection channel 56. As the chamber inlet 104 is arranged with a radial distance to the center front opening 42, the connection channel 56 must be orientated with a radial component.

It should be clear from the above the automotive electrical oil pump is not limited to the above described embodiments. Other pumping units than a gerotor can in particular be used. Other designs of the pump housing or the gerotor are also conceivable. Reference should also be had to the appended claims.

REFERENCE NUMERALS 10 automatic electric oil pump
12 electric driving motor
14 pumping unit
18 pump housing
22 fluid connector
26 electrical connector plug
28 rotation axis
30 radial plugging direction
34 flange portion
42 center front opening
44 pump inlet
54 first circular opening wall
56 connection channel
58 outer circumferential surface
62 first wall groove
68 radial sealing
72 second circular opening wall 76 ring front opening
77 pump outlet
78 intermediate opening
80 outer circumferential surface
84 second wall groove
88 radial sealing
92 gerotor assembly
96 pump rotor
100 pump chamber
104 chamber inlet
108 chamber outlet

What is claimed is:

1. An automotive electrical oil pump comprising: an oil displacement pumping unit comprising a pump rotor which is configured to rotate in a pump chamber so as to pump a pressurized oil to an oil recipient; an electric driving motor configured to drive the pump rotor of the oil displacement pumping unit; an electrical connector plug configured to electrically connect the electric driving motor to a power source; and a fluid connector comprising, a center front opening which defines a pump inlet, the pump inlet being fluidically connected to a chamber inlet, a ring front opening which is arranged coaxially to the center front opening, the ring front opening defining a pump outlet which is fluidically connected to a chamber outlet, wherein, a rotation axis of each of the oil displacement pumping unit and the electric driving motor is the same as an axis of the fluid connector, and the oil displacement pumping unit is defined by a gerotor assembly.

2. The automotive electrical oil pump as recited in claim 1, wherein,
the fluid connector further comprises a first circular opening wall arranged coaxially to the center front opening, and
the first circular opening wall is configured to fluidically separate the center front opening and the ring front opening.

3. The automotive electrical oil pump as recited in claim 2, further comprising:
a pump front side comprising the pump inlet and the pump outlet,
wherein,
the first circular opening wall is arranged coaxially to the rotation axis of the electric driving motor, and
the first circular opening wall is arranged at the pump front side.

4. The automotive electrical oil pump as recited in claim 1, wherein,
the fluid connector further comprises a first circular opening wall and a second circular opening wall which are arranged coaxially to each other,
the first circular opening wall is configured to fluidically separate the center front opening and the ring front opening, and
the second circular opening wall is configured to surround the center front opening, the ring front opening, and the first circular opening wall.

5. The automotive electrical oil pump as recited in claim 4, further comprising:
a pump front side comprising the pump inlet and the pump outlet,
wherein,
the first circular opening wall and the second circular opening wall are arranged coaxially to the rotation axis of the electric driving motor, and
the first circular opening wall and the second circular opening wall are arranged at the pump front side.

6. The automotive electrical oil pump as recited in claim 5, wherein the electrical connector plug is arranged radially with a plugging direction which is substantially radial with respect to the rotation axis.

7. The automotive electrical oil pump as recited in claim 1, wherein the pump inlet is arranged radially inside of the pump outlet.

8. The automotive electrical oil pump as recited in claim 1, wherein the pump outlet is arranged radially inside of the pump inlet.

9. The automotive electrical oil pump as recited in claim 4, wherein at least one of the first circular opening wall and the second circular opening wall comprises a radial sealing ring.

10. The automotive electrical oil pump as recited in claim 9, wherein the radial sealing ring or a respective radial sealing ring is arranged at an outer circumferential surface of the first circular opening wall and/or of the second circular opening wall.

11. The automotive electrical oil pump as recited in claim 1, further comprising:
a connection channel configured to connect the center front opening with the chamber inlet or with the chamber outlet,
wherein,
the connection channel comprises an orientation with a radial component.

12. An automotive electrical oil pump comprising: an oil displacement pumping unit comprising a pump rotor which is configured to rotate in a pump chamber so as to pump a pressurized oil to an oil recipient; an electric driving motor configured to drive the pump rotor of the oil displacement pumping unit, the electric driving motor comprising a rotation axis; an electrical connector plug configured to electrically connect the electric driving motor to a power source; and a fluid connector comprising, a center front opening which defines a pump inlet, the pump inlet being fluidically connected to a chamber inlet, a ring front opening which is arranged coaxially to the center front opening, the ring front opening defining a pump outlet which is fluidically connected to a chamber outlet, and a first circular opening wall arranged coaxially to the center front opening, wherein, the pump inlet and the pump outlet are arranged on a pump front side, the first circular opening wall is configured to fluidically separate the center front opening and the ring front opening, the first circular opening wall is arranged at the pump front side, and the first circular opening wall is arranged coaxially to the rotation axis of the electric driving motor, and the oil displacement pumping unit is defined by a gerotor assembly.

13. The automotive electrical oil pump as recited in claim 12, wherein,
the fluid connector further comprises a second circular opening wall which is arranged coaxially to the first circular opening wall, and
the second circular opening wall is configured to surround the center front opening, the ring front opening, and the first circular opening wall.

14. The automotive electrical oil pump as recited in claim 13, wherein, the second circular opening wall is arranged coaxially to the rotation axis of the electric driving motor, and the second circular opening wall is arranged at the pump front side.

15. The automotive electrical oil pump as recited in claim 14, wherein the electrical connector plug is arranged radially with a plugging direction which is substantially radial with respect to the rotation axis.

16. The automotive electrical oil pump as recited in claim 13, wherein at least one of the first circular opening wall and the second circular opening wall comprises a radial sealing ring.

17. The automotive electrical oil pump as recited in claim 16, wherein the radial sealing ring or a respective radial sealing ring is arranged at an outer circumferential surface of the first circular opening wall and/or of the second circular opening wall.

18. The automotive electrical oil pump as recited in claim 12, further comprising:
- a connection channel configured to connect the center front opening with the chamber inlet or with the chamber outlet, wherein, the connection channel comprises an orientation with a radial component.

* * * * *